Figure 1:
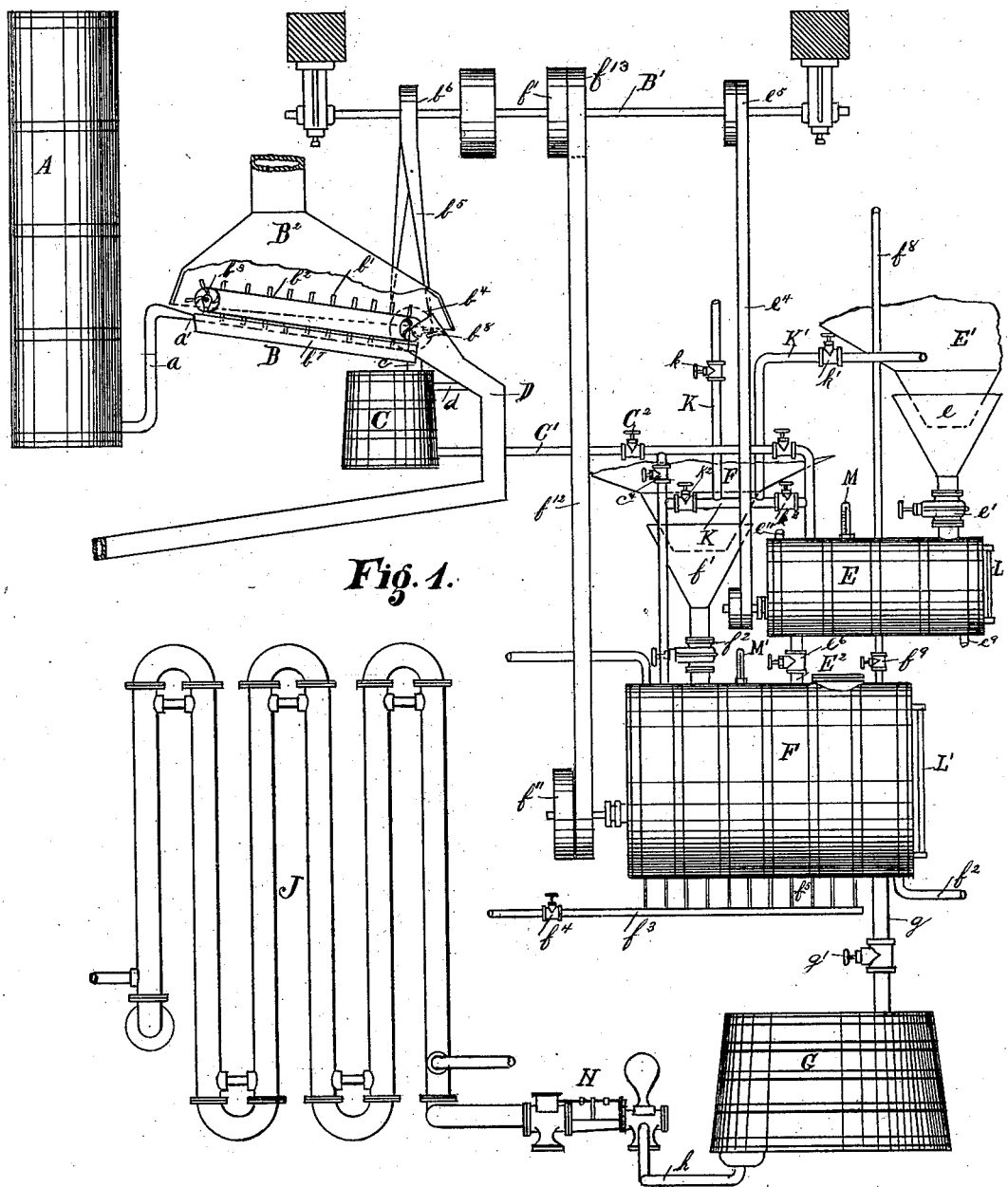

(No Model.) 3 Sheets—Sheet 1.

T. HAYES.
APPARATUS FOR MASHING GRAIN.

No. 295,004. Patented Mar. 11, 1884.

Attest
Joseph W Sims
Chas. Anderson

Inventor
Timothy Hayes
By John W Hill
Attorney

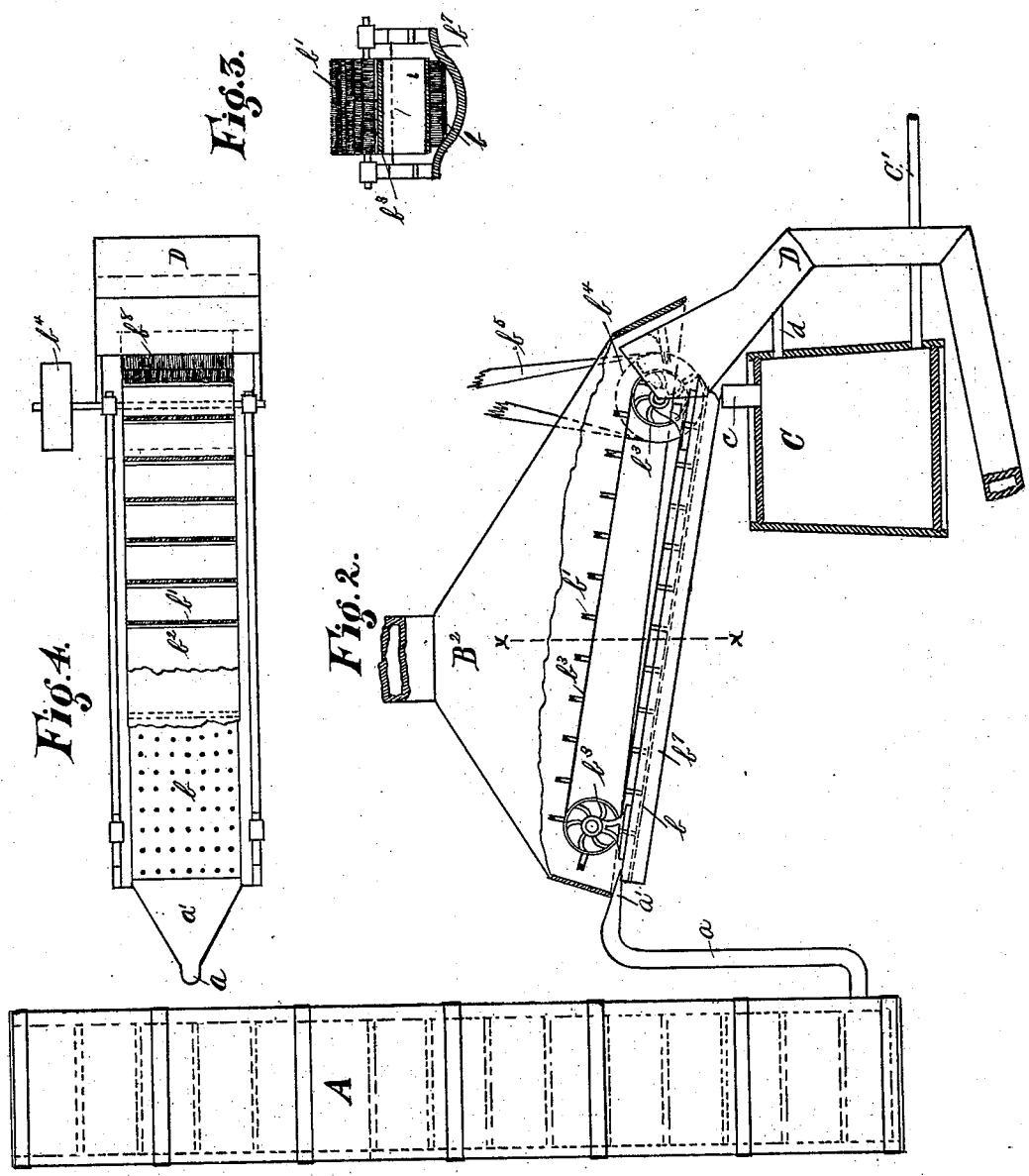

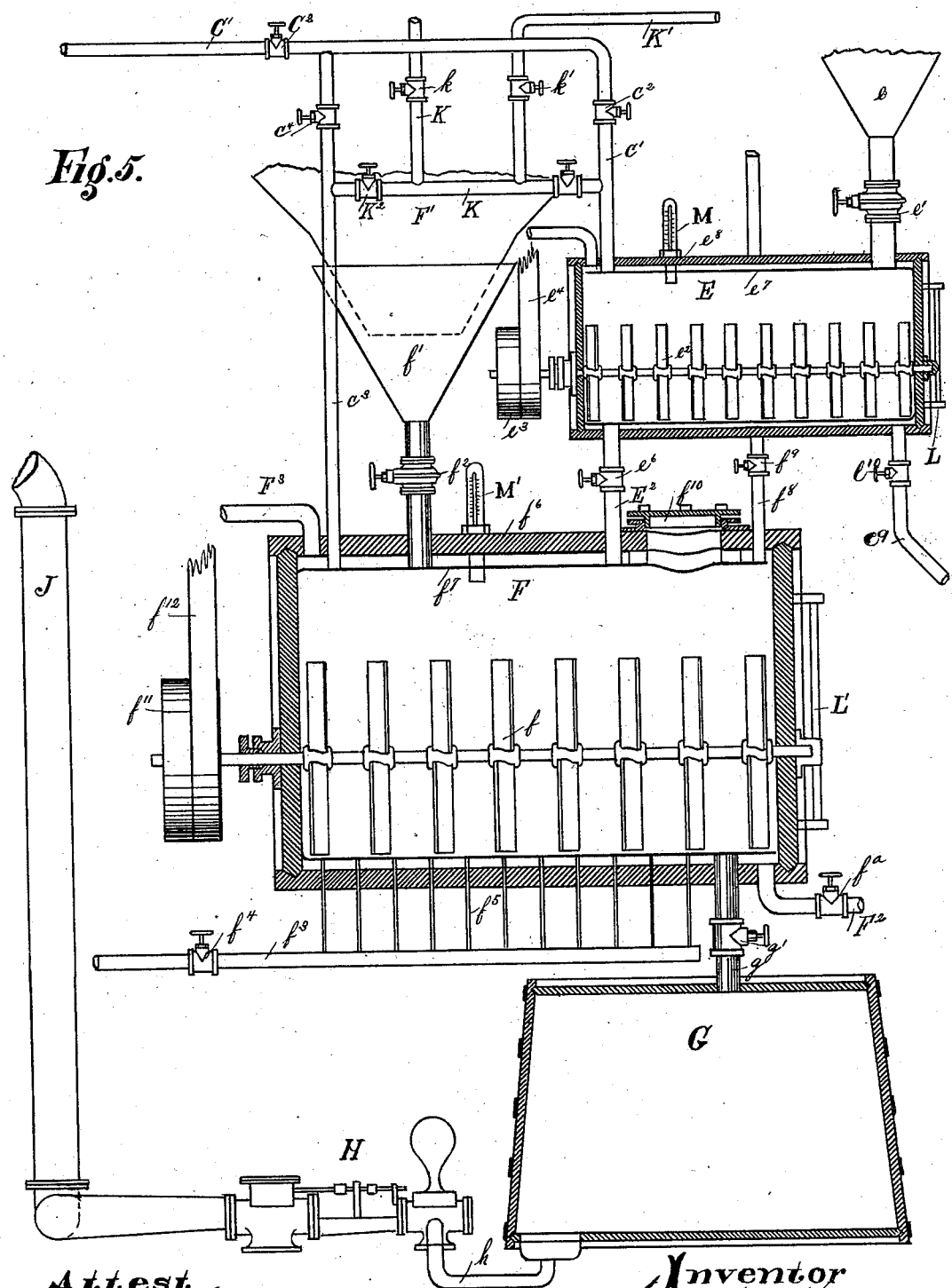

UNITED STATES PATENT OFFICE.

TIMOTHY HAYES, OF ANDERSON'S FERRY, OHIO.

APPARATUS FOR MASHING GRAIN.

SPECIFICATION forming part of Letters Patent No. 295,004, dated March 11, 1884.

Application filed November 6, 1883. (No model.)

*To all whom it may concern:*

Be it known that I, TIMOTHY HAYES, of Anderson's Ferry, in the county of Hamilton and State of Ohio, have invented certain new and useful Improvements in Apparatus for Mashing Grain, of which the following is a specification.

My invention relates to apparatus for mashing grain in distilleries; and it consists, first, in a novel arrangement of devices whereby the slop from the high-wines or beer-still is used to mix with the small grain or malt in a special malt-tank and to mix with the large grain in the mash-tank proper, the slop being separated as it comes from the still into the solids, which, by suitable traveling brushes, is swept into a spout, to be finally conveyed to the slop or feed tubs and into the liquid, which is conveyed by a suitable trough and spout into the slop-tub, from which it is drawn as required into the tanks, for mixing the small grain and for mashing the large grain, an overflow spout or pipe from the slop-tub carrying the excess of liquid slop into the previously-mentioned spout leading to the feed-tubs; and, second, in a novel construction of closed mixing-tank for mixing the small grain or malt with the slop or water, as may be required, in combination with a novel construction of a closed mashing-tank for mixing the large grain first with the slop or water, as required, and, finally, for mashing the large grain and the previously-mixed small grain or malt together to complete the mash.

The system which I shall hereinafter fully explain is known as "mashing under pressure;" but the pressure I employ is low—but two or three pounds above the atmosphere—and comprehends closed vessels for the reception of the slop, for mixing the small grain, for mashing the large grain and small grain or malt, and for receiving the mash after it has been mixed and heated properly in the mashing-tank. In my system the small grain (or malt) is mixed with the requisite quantity of liquid slop (or slop and water) in a separate tank provided with an agitator or rotary rake driven by suitable belt or gearing, and annular jacket, through which water may be passed to cool down the slop previous to the admission of small grain or malt, while the large grain is first mixed with the requisite amount of liquid slop in a separate mashing-tank provided with suitable steam-boiling pipes and a rotary rake or agitator, and connected by means of a closed pipe and valve with the tank for mixing the small grain or malt and slop. The mashing-tank is also provided with an annular jacket, through which water is passed to cool down the mash to the proper degree for admission of the small grain or malt from the previously-mentioned mixing-tank. The receiver is connected with the mashing-tank by means of a closed pipe and valve, and is charged with the successive mashes at the rate of, say, one mash every two hours. From the receiver the mash is forced, by means of a suitable pump, through a system of cooling-pipes into the customary fermenting-tubs.

My system embraces, in the order of their operation, devices for separating the slop into the liquid and solid matter; delivering the solid matter through pipes or troughs to the feed-tubs and collecting the liquid slop in a tub or reservoir, from which it is drawn for mixing or mashing, as required; separate vessels connected with the slop-tub, in which the small grain or malt is mixed, and in which the large grain is mixed and heated and the mash completed; a closed receiver into which the mash is dumped from the mashing-tank; a pump to take the mash from the receiver and pump it through the coolers; and any suitable arrangement of cooler-pipes to cool down the mash on its way to the fermenting-tubs, all of which will be fully described hereinafter.

In the accompanying drawings, Figure 1 represents a general elevation of the several devices embraced in my improved system of mashing. Fig. 2 represents, partly in elevation and partly in section, the devices for separating the solid and liquid matter in the slop, for storing the slop, and for distributing it to the mixing-tanks. Fig. 3 is a transverse section of the slop-separating mechanism. Fig. 4 is a plan of the devices shown in Fig. 3; and Fig. 5 represents, partly in section and partly in elevation, the mixing-tank for small grain, the mashing-tank, the receiving-tank, and the pump and cooling-pipes.

Similar letters of reference indicate similar parts.

A is a still of any approved style, for the conversion of beer mash or wort into high-wines, from the lower chamber of which the slop-pipe $a$ leads to the separator B, upon the screen or perforated plate $b$ (see Fig. 4) of which the slop is spread by the fan-tail $a'$.

$b'$ $b'$ are brushes of any suitable construction, arranged transversely upon the endless belt $b^2$, and driven in the direction of the arrows, Figs. 1 and 2, by means of pulleys $b^3$ $b^3$, pulley $b^4$, belt $b^5$, and pulley $b^6$ upon line-shaft B'.

$b^7$ is a trough suspended under the screen $b$, and arranged to collect the liquid slop from the separator B, and deliver it by means of pipe $c$ into the slop tub or reservoir. As the slop is delivered by pipe $a$ and fan-tail $a'$ upon the perforated plate or screen $b$, the latter intercepts and retains the solid matter, while the liquid flows through the perforations of screen $b$ into collecting-trough $b^7$, while the traveling brushes $b'$ $b'$ sweep the solid matter as rapidly as it is deposited from the plate or screen $b$, and finally, by means of the stationary brush $b^8$, deposits it in pipe or spout D, whence it is conveyed by gravity to the feed-tubs. (Not shown.)

$d$ is an overflow-pipe from tub C, which conveys any excess of liquid slop into pipe D.

$B^2$ is a hood or housing arranged above separator B, to collect the vapor which may arise, and by a suitable pipe convey it from the mash-room.

E is a tank for mixing of the small grain or malt previous to its introduction into the mash-tank, provided with a spout or hopper, $e$, and valve $e'$, Fig. 1, through which the small grain or malt, previously weighed into hopper E', is conveyed to the tank, and an agitator or rotary rake, $e^2$, which is driven by pulley $e^3$, belt $e^4$, and pulley $e^5$ on line shaft B' at any proper speed to mix the small grain and slop. A branch pipe, $c'$, from slop-pipe C', provided with valve $c^2$, controls the admission of liquid slop to the tank E, while a pipe, $E^2$, and valve $e^6$ controls the discharge of mixture of small grain and slop to the mash-tank. The tank E is constructed of an inner shell of copper or iron, $e^7$, and an outer jacket of wood, $e^8$, with a space of one inch between the shells, to form a water-jacket, to be used when it is desired to cool down the water or slop to the proper degree for the admission of the small grain or malt. $e^9$, Fig. 1, is the water-inlet, controlled by valve $e^{10}$; and $e^{11}$ is the water-outlet, from which the heated cooling-water is conveyed away by a suitable pipe.

F is the mash-tank for mixing the large grain and for making the mash after the contents of tank E have been drawn into it. This tank is provided with the slop-pipe $c^3$, Fig. 5, and valve $c^4$, to regulate the draft of liquid slop from tub C, and with an agitator or rotary rake, $f$, to stir the mixture of grain and slop. A hopper, $f'$, and valve $f^2$ receive the weighed grain (after it has been ground) from the weighing-hopper F'.

$f^3$ is a steam-pipe, provided with stop-valve $f^4$ and numerous small steam-pipes $f^5$ $f^5$, which branch from pipe $f^3$ and pass through shells $f^6$ and $f^7$ into the mash-tank F, to furnish the heat for the mash.

$f^8$ is a vent-pipe with stop-valve $f^9$, to vent the steam from mash-tank after the cooking process is completed. A man-hole and cap, $f^{10}$, permits of entrance to the tank F for cleaning when necessary. The shell $f^6$ of tank F is of wood, and the shell $f^7$ is of copper to resist the corrosive properties of the acids of the slop. The agitator $f$ is driven by pulley $f^{11}$, belt $f^{12}$, and pulley $f^{13}$ on line-shaft B'.

$F^2$ is the inlet-connection for the supply of water to the jacket of tank F, and $F^3$ the water-outlet, from which the heated water is conveyed away by a suitable pipe. The cock $f^a$ regulates the flow of water to the jacket.

G is the receiving-tank, provided with pipe $g$ and valve $g'$, which controls the inflow of mash from tank F.

H is a pump of any approved kind, which takes the mash from tank G through suction-pipe $h$ and pumps it through the cooler J. This cooler may be of any approved form suitable for the rapid and complete abstraction of the heat from the mash in transit to the customary fermenting-tubs.

When desired, the tanks E and F may be supplied with water, either hot or cold, through pipes K K' K² and stop-valves $k$ $k'$ $k^2$ $k^3$, one pipe, K, furnishing cold water, and the other pipe, K', furnishing hot water.

$C^2$ is a valve in pipe C', to control the flow of liquid slop to either tank E or F.

L L' are glass tube gages, placed, as shown, in the ends of the tanks E and F, respectively, to indicate the quantity of slop drawn into said tanks from pipes $c'$ or $c^3$; and M M' are ordinary mercurial thermometers placed in tanks E and F, respectively, as shown, to indicate the temperatures of contents.

The operation of the apparatus is as follows: The rakes $e^2$ and $f$ being first started, slop is taken in sufficient quantities, as shown by glass gage L', into mashing-tank F, and, if required, this slop is then cooled to the proper temperature (by means of the described water-jacket) for admission of the charge of weighed meal of corn or other grain from weighing-hopper F'. Directly the slop is sufficiently heated to receive the meal, the meal is introduced, the valve-stem $f^1$ is opened, and the heating of the slop and meal carried on. The meal having been introduced into tank F, valve $f^2$ in the tank F is closed and the meal stirred by rake $f$, (which is in constant operation while the apparatus is in use.) The mixture of meal and slop is then stirred, and heated from steam-jets $f^5$ until the process of cooking is completed, when the steam-valve $f^4$ is closed and the steam-vent valve $f^9$ on the top of tank F opened to blow out the vapor from tank F. The contents of the tank are then cooled by the water-jacket to the proper temperature for admission of small grain or malt, which has meanwhile been mixed, as will be described, in tank E. During the time the previously-described operation is going on in tank F, tank E has been operated to prepare the small grain or malt for the mash in the following manner: All other connections to tank E being closed, cock $c^2$ on pipe C' is opened and the requisite quantity of slop, as shown by glass gage L, drawn into it. Cock or valve $c^2$ is then closed and the temperature of slop reduced, by means of the water-jacket previously described for this tank, to a proper degree for admission of the charge of previously-weighed small grain or malt in the weighing-hopper E'. (See Fig. 1.) The slop having been cooled to the proper temperature, valve $e'$ (see Fig. 5) is opened and the grain or malt introduced. Valve $e'$ is then closed. The rake $e^2$ (which is always in motion) then stirs and mixes the solution of small grain or malt and slop until it is ready to be charged into the previously-cooled mash in tank F. Valve $e^6$ is then opened and the contents of tank E charged into tank F. Valve $e^6$ is then closed and the mixture of contents of tanks E and F thoroughly stirred or mashed in tank F, when the whole is discharged into receiving-tank G through pipe $g$ and valve $g'$. After the contents of tank F have passed into tank G, valve $g'$ is closed, and the previously-described operation for tanks F and E repeated indefinitely. The contents of tank F are first prepared because of the greater length of time required to cook the mash. No steam or heat other than that obtained from the slop is used in tank E, and the steaming or cooking of contents of tank F takes place prior to the introduction of the slop and small grain or malt from tank E. After the mash is delivered to the receiving-tank G, it is then pumped through the cooler J to the customary fermenting-tubs (not shown) while a new mash is being prepared.

The novelty of my invention lies chiefly in the use of slop for mixing with the small grain in tank E and corn or other grain in tank F, whereby a larger yield of spirit is obtained from a given amount of grain by the amount of spirit obtained from the unconverted slop. The slop may be worked over indefinitely until it becomes so thick that hot or cold water may be required to thin it through the pipes and valves provided for that purpose.

The liquid slop from the tank C may be charged to the mashing-tank F, yeasted, and worked over to obtain the spirit from it by the usual process of fermentation in distillation.

I am aware that horizontal mixing or mashing tanks with rotary rakes to stir the contents, and the necessary connections therewith for water, meal, small grain, steam, and for discharging the contents, are not new, but have been used heretofore for mashing with high-pressure steam. This I do not claim.

The within-described process is in no manner calculated to injure the mash, and, as demonstrated by practical experience, adds from two to three quarts of spirit to the "yield" per bushel of mash, and permits of rapid handling of the materials, (the process being practically continuous,) and enables a small plant to accomplish a large amount of work. The mixing and receiving vessels being all closed to the atmosphere, no oxidation of the mash can occur previous to the delivery thereof to the fermenting-tubs. Besides, the mash-room is always free from vapor or condensation of steam, the well-known deleterious effects of a foggy damp atmosphere in the mashing-house being entirely avoided.

I am aware that in an apparatus for separating malt extract from husks or refuse mash there has been combined an endless revolving foraminous apron, a pair of pressure-rolls, and a brush for cleaning the meshes of the apron, and a suitable receptacle for collecting and securing the liquid portion, which constitutes the malt extract; and I lay no claim thereto.

Having described my invention, what I claim is—

1. The combination of the separator B, the tub C, to receive the slop therefrom, the tanks E and F, each composed of an inner and outer shell and provided with an agitator, the pipe C', leading from tub C and communicating by branch pipes with the tanks E and F, said pipes being provided with suitable valves, means for introducing small grain into tank E, means for introducing large grain and steam into tank F, the line-shaft B', and belts connecting said line-shaft with pulleys on the shafts of agitators in tanks E and F, and the pulley on a traveling belt of the separators, substantially as described.

2. The combination, with pipe $a$, tub C, spout D, and pipe $d$, connecting tub C with spout D, of the separator composed of the screen $b$, the belt $b^2$, provided with brushes $b'$, and trough $b^7$, substantially as described.

3. The combination, with pipe $a$, tub C, and spout D, of the separator composed of the screen $b$, the belt $b^2$, provided with brushes $b'$, trough $b^7$, and brushes $b^3$ $b^8$, substantially as described.

4. The combination of tanks E and F, communicating through pipe $E^2$, provided with a valve, pipe $c'$, leading from pipe C' to tank E, pipe $c^3$, leading from pipe C' to tank F, pipe K, connecting pipes $c'$ $c^3$, and pipe K', leading to pipe K, the several pipes being provided with valves, substantially as described.

5. The combination of mixing-tank E and mashing-tank F with slop-tank C and receiving-tank G, pump H, and cooler J, substantially as and for the purpose described.

In testimony whereof I have signed my name to the foregoing specification in the presence of two subscribing witnesses.

TIMOTHY HAYES.

Witnesses:
CHAS. ANDERSON,
JOSEPH W. SIMS.